M. R. KARGE.
UNIVERSAL POWER TRANSMITTING ELEMENT.
APPLICATION FILED JAN. 28, 1919.

1,429,146.

Patented Sept. 12, 1922.

WITNESS:

INVENTOR.
Maxwell R. Karge
BY
ATTORNEYS.

Patented Sept. 12, 1922.

1,429,146

UNITED STATES PATENT OFFICE.

MAXWELL R. KARGE, OF PHOENIX, NEW YORK, ASSIGNOR, BY MESNE ASSIGNMENTS, TO CHARLES J. DECKOP, OF BUFFALO, NEW YORK.

UNIVERSAL POWER-TRANSMITTING ELEMENT.

Application filed January 28, 1919. Serial No. 273,548.

*To all whom it may concern:*

Be it known that I, MAXWELL R. KARGE, a citizen of the United States, and a resident of Phoenix, in the county of Oswego and State of New York, have invented a certain new and useful Universal Power-Transmitting Element, of which the following is a specification.

This invention has for its object a flexible universal power transmitting element capable of use as a universal joint or as a flexible shaft for transmitting power around any angle which power transmitting element is particularly simple and economical in construction and highly efficient and durable in use; and the invention consists in the novel features and in the combinations and constructions hereinafter set forth and claimed.

In describing this invention, reference is had to the accompanying drawings in which like characters designate corresponding parts in all the views.

This power transmitting element comprises generally, a cylindrical, coiled torsion spring having couplings at its opposite ends for connection to parts as shafts, etc., from which the power is taken and to which it is transmitted.

Figure 1:
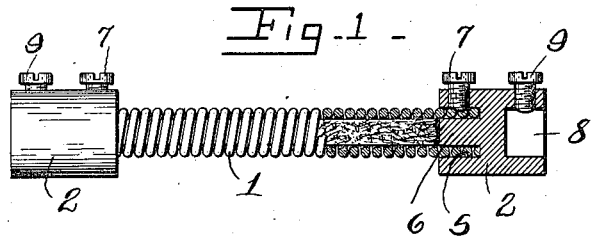
Figure 1 is a longitudinal sectional view, of one form of this power transmitting element.
Figure 3:
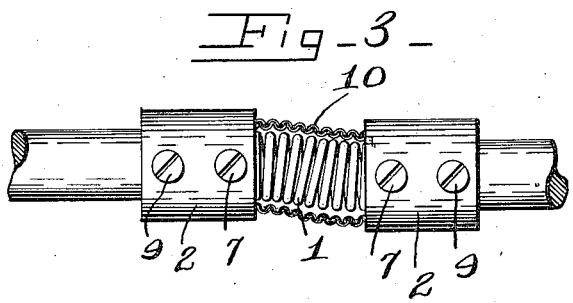
Figure 3 is an elevation of one form of my power transmitting element when used as a universal joint.

The coils are arranged close together so that when the coupling is used as shown in Figs. 1 and 3, that is, when it is connecting shafts more or less out of alinement the coils come together and frictionally engage after the manner of friction plates after the predetermined amount of torque has been applied to the spring, or the spring tensioned a predetermined amount. When, however, two shafts arranged at a comparatively great angle are connected together by my coupling, and a longer spring is necessary, the coils are separated farther and in this situation the coils at the curve of the spring cannot find a bearing throughout their extent on each other.

When the motion is to be transmitted in one direction as to the right or to the left, one spring is used, but when the motion is to be transmitted in either direction two springs are used coiled in opposite directions and are located one within the other.

In Figure 1 is illustrated one form of my power transmitting element consisting of a single spring adapted to transmit motion to the right or in a clockwise direction.

1 designates the spring and 2 the couplings at the end of the spring for connection to the shafts or other parts from which the power is taken and to which it is delivered by the spring.

Figure 2:
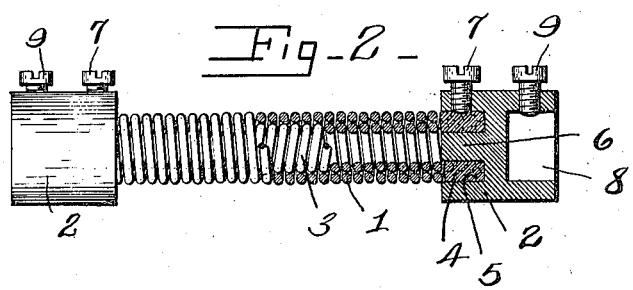
Figure 2 is a similar view of another form thereof.

In Figure 2 the coupling is shown as capable of transmitting motion in either direction and is shown as provided with an inner spring 3 coiled in the opposite direction from the spring 1 and capable of transmitting motion to the left or in an anti-clockwise direction. The spring 1 transmits the motion in a clockwise direction and the spring 2 receives the torque when transmitting the motion in an anti-clockwise direction. When two springs are used they are connected together at their ends at 4 by welding or in any other suitable manner.

Each coupling is provided with a socket 5 for receiving the end of the spring or springs and with a stud 6 arranged coaxially with the socket to enter within the coils at the end of the spring or springs and the spring or springs are secured in the socket by means clamping against the side of the stud, here shown as the set screw 7 extending through the socket from the outer wall thereof and bearing against the outer spring.

Each coupling here shown is provided with suitable means for connection to the part to which or from which the power is to be transmitted, this means being here shown as a socket 8 in which the part is secured in any suitable manner as by a set screw 9. However, any suitable form of coupling may be employed and compression means may be used instead of set screws to clamp the couplings onto the spring against the stud or to clamp the couplings onto the parts to and from which the motion is transmitted.

Preferably, in order to keep the springs from deterioration by heating or rusting, etc., means is provided consisting of a wick 9ᵃ or other absorbent material located within the coils of the spring in which a lubricating and cooling medium is held. The springs are usually made of specially treated steel wire and in some of the larger couplings such as used in motor vehicles and in shafting are made of bronze. Also the wire of the springs may be round as shown in cross section or square or any other suitable form. Preferably, in the shorter forms of power transmitting elements such as are used for universal joints or motor vehicles, a covering 10 is provided consisting of a tube formed from a coiled strip of metal, the ends of the tube extending into the sockets of the couplings.

Figure 4:
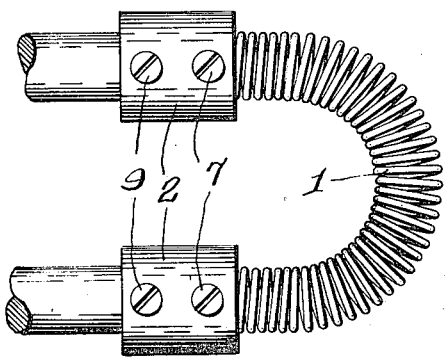
Figure 4 illustrates another use of my power transmitting element, showing the same as transmitting the motion around an angle of 180°.

This universal power transmitting element is applicable for use as universal joints, instruments as dental machines and in mechanisms such as the drive shafts of automobiles or for connecting shafts which are out of alinement as shown in Figures 3, and 4 for transmitting motion around any angle. This coupling is particularly advantageous in that it can be produced at very much less cost than universal joints and other devices for transmitting motion around angles now in use, and further takes up shocks when starting especially when used in the drive shaft of motor vehicles or when connecting lines of shafting.

What I claim is:

1. A flexible universal power transmitting element comprising a cylindrical coiled spring, and couplings mounted on the end coils of the spring, each coupling being formed with a sleeve portion encircling the end coils of the spring and engaging the peripheries thereof, and a plug fitting onto said end coils whereby such end coils are snugly fitted into an annular socket in the coupling, substantially as and for the purpose described.

2. A flexible universal power transmitting element comprising a cylindrical coiled spring and couplings mounted on the ends of the springs, each coupling being formed with an annular socket of substantially the dimensions as the coils of the spring, for receiving the contiguous end of the spring, and means for securing the spring in the socket, substantially as and for the purpose specified.

3. A flexible universal power transmitting element comprising cylindrical coiled torsion springs wound in opposite directions and arranged one within the other, the springs being connected together at their ends, and couplings mounted on the ends of the springs, each coupling being formed with a socket and an axial stud arranged centrally of the socket forming an annular space in which the ends of the spring extend, the stud extending into the end of the inner spring, and means for clamping the springs onto the stud, substantially as and for the purpose described.

In testimony whereof, I have hereunto signed my name, at Syracuse, in the county of Onondaga, and State of New York, this 16th day of January, 1919.

MAXWELL R. KARGE.